UNITED STATES PATENT OFFICE.

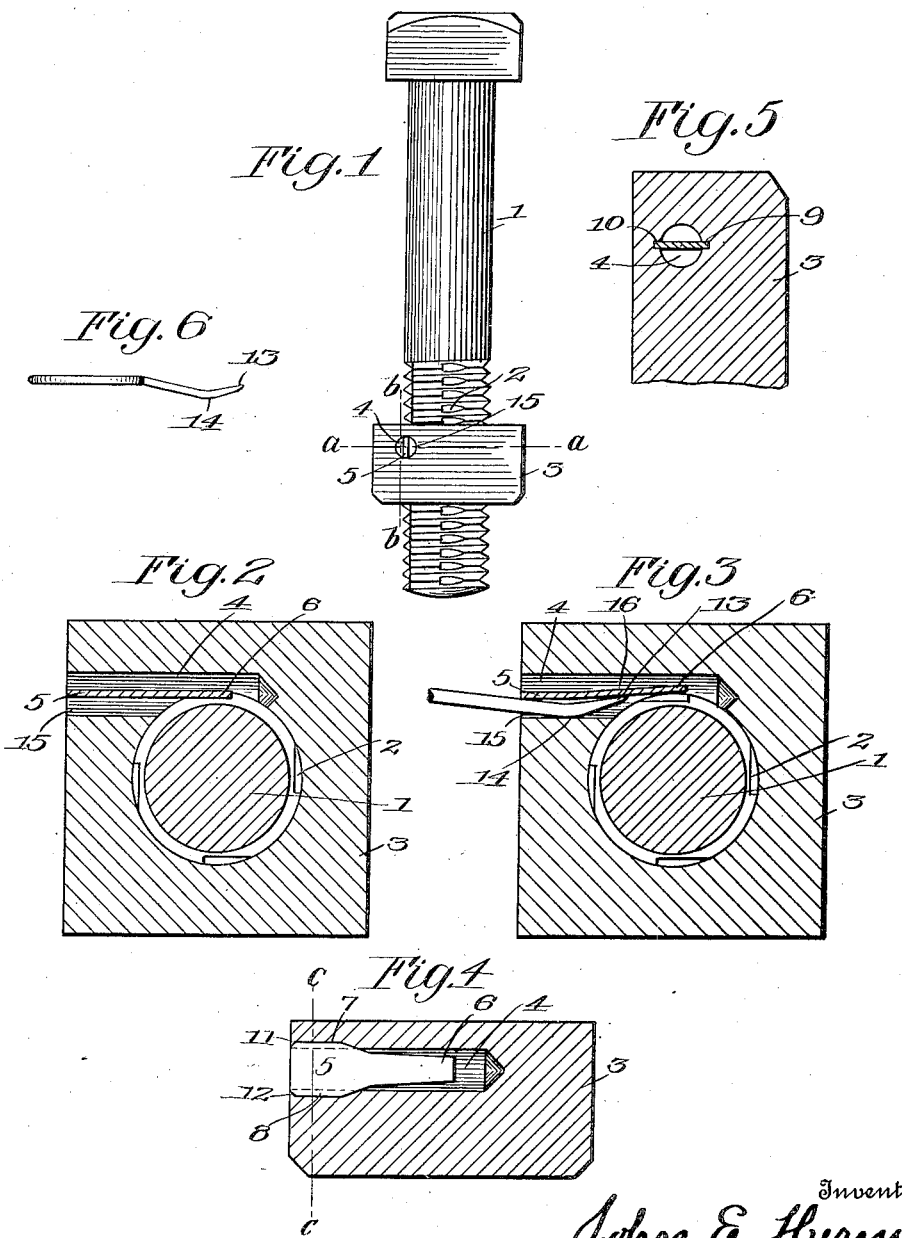

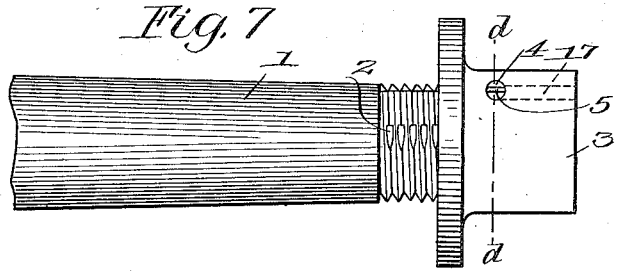
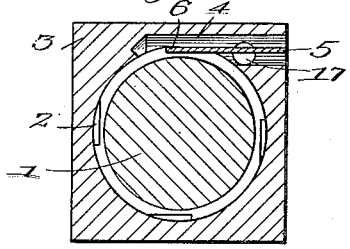
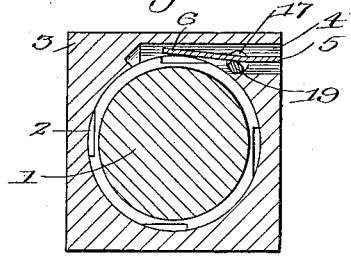
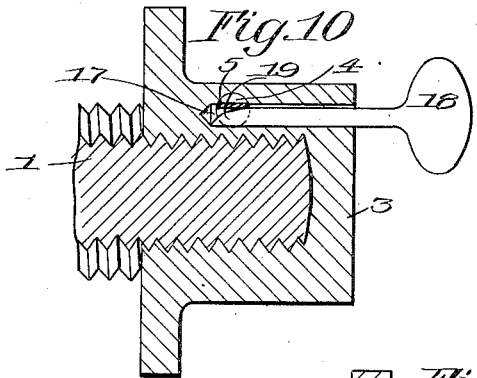
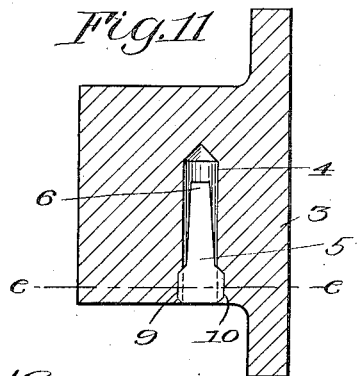
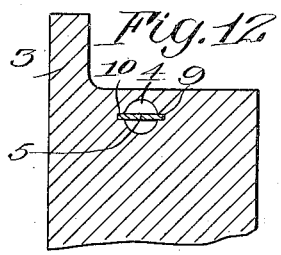

JOHN EDWARD HERMAN, OF ROCHESTER, NEW YORK.

NUT-LOCK.

1,057,548.　　　　Specification of Letters Patent.　　Patented Apr. 1, 1913.

Application filed June 10, 1912.　Serial No. 702,657.

*To all whom it may concern:*

Be it known that I, JOHN EDWARD HERMAN, a citizen of the United States, residing at Rochester, in the county of Monroe and State of New York, have invented a new and useful Nut-Lock, of which the following is a specification.

My invention relates to improvements in nut-locks of that class in which the nut is fastened to the bolt against unscrewing by means of a spring pawl, which engages in a groove in the bolt, and the main objects of the invention is to provide a nut-lock that shall be simple in its construction, economical in its production and efficient in its operation, and which shall operate automatically and which can be readily unlocked.

The invention also relates to certain details of construction which will be hereafter described, reference being had to the accompanying drawing in which:

Figure 1 is a view of a threaded bolt, provided with longitudinal grooves and a nut thereon, equipped with the locking pawl; Fig. 2 is a transverse view following line "*a—a*" of Fig. 1, showing recess in nut within which the locking pawl is positioned, said pawl being in engagement with one of the longitudinal grooves of the bolt; Fig. 3 is the same as Fig. 2, except that the pawl is raised out of engagement by means of a key provided therefor; Fig. 4 is a transverse view following line "*b—b*" of Fig. 1, showing the form and position of the pawl in said recess; Fig. 5 is a transverse view following line "*c—c*" of Fig. 4, showing the shoulders of said pawl embedded within the walls of said recess; Fig. 6 is a side view of the key used in disengaging said pawl from engagement as shown in Fig. 3; Fig. 7 is a sectional view of a wagon axle with nut provided with the nut-lock, showing separate key-hole, entering from the face of the nut; Fig. 8 is a transverse view following line "*d—d*" of Fig. 7, showing locking pawl in engagement; Fig. 9 is the same as Fig. 8, except that said pawl is raised out of engagement by means of a key, a transverse view of which is shown; Fig. 10 is a longitudinal transverse view showing form of key used and method of disengagement of locking pawl, said key being inserted and pawl elevated thereby; Fig. 11 is a transverse view of a wagon nut equipped with nut lock, which view corresponds with that of Fig. 4, and Fig. 12 is a sectional transverse view of a wagon nut provided with nut lock, which view corresponds with Fig. 5.

Similar figures refer to similar parts throughout the several views.

As will be observed, two forms of the invention are shown,—the nut locking and unlocking construction as used commonly with ordinary bolts, and the construction used commonly on wagons, buggies and other vehicles. In the former the construction is more simple, requiring but one aperture or recess for the securing of the pawl, the space in which said pawl operates, and the space in which the key operates in raising the automatically locking pawl out of engagement; while in the latter a separate aperture is provided for the key, the collar of the hub of the wheel necessitating the insertion of the key through the face of the nut. The method of unlocking the nut constituting the only difference between the two forms.

Referring to the drawings accompanying this specification, it will be seen that my invention comprises a bolt or axle 1, provided with longitudinal grooves 2, which extend across the threaded portion of the bolt or axle. These grooves are so arranged and constructed, as shown in the drawing, that when the nut is being turned on the pawl, hereinafter described, will pass successively into and out of them, but whenever the nut is turned in the opposite direction, said pawl impinges against the abrupt edge of the groove into which it first falls, locking the nut. Into the nut 3 there is drilled a cylindrical recess 4, into which is positioned pawl 5, which tapers slightly toward its front 6, which enables the requisite play within said recess in the engagement and disengagement of said pawl with said grooves, the narrowest portion of said pawl being necessarily raised the higher in the act of disengagement and thereby coming into the narrower portion of the recess in which it operates. Said pawl is driven into said recess; the shoulders 7 and 8 embedding themselves into the wall of said recess, at opposite points 9 and 10. The nut being of iron, while said pawl is constructed of hardened steel, thin and flat, this is readily accomplished. The grooves in the wall of said recess thus produced are closed exteriorly over said shoulders on the pawl, by compression, whereby the pawl is the more securely held in position. The recess and pawl within the same are so constructed and disposed that the pawl impinges automatically said grooves in the bolt or axle, as the nut is turned on, locking the same. To disengage said pawl from engagement with said grooves in said bolt or axle, a key, Fig. 6, is provided, having point 13 and fulcrum 14, said key is inserted, fulcrum down, into aperture 15, being the lower portion of said recess, underneath said pawl and presses against it at point 16, raising the same out of engagement, as shown.

In the form used on vehicles, the nut, equipped with my lock, is unlocked by inserting a key 18 into recess or aperture 17, said recess or aperture entering the face of the nut, as shown. The point 19 of key, 18, enters transversely beneath said pawl and raises it out of engagement, as shown in Figs. 9 and 10, unlocking the nut.

What I claim is:

1. A nut-lock comprising a threaded bolt, provided with longitudinal grooves; a nut, provided with an exteriorly-entering cylindrical recess, disposed transversely to said bolt, and a spring pawl secured within said recess at its longitudinal center,—all constructed and disposed, so that said pawl engages said grooves when the nut is turned on, whereby said nut is locked.

2. A nut-lock comprising a threaded bolt, provided with longitudinal grooves; a nut, provided with an exteriorly-entering cylindrical recess, positioned transversely to said bolt; a spring pawl, provided with integral shoulders at its exterior end and tapering slightly toward its interior end, said pawl being secured within said recess at the longitudinal center thereof, by having said shoulders embedded within the walls of said recess,—all constructed and disposed to lock securely a nut, substantially as described and set forth.

3. A nut-lock, comprising a threaded bolt, provided with longitudinal grooves; a nut, provided with an exteriorly-entering cylindrical recess, positioned transversely to said bolt; a spring pawl, provided with shoulders at its exterior end and tapering slightly toward its interior end, said shoulders engaging the walls of said recess, producing grooves therein, engaged by said shoulders, said shoulders being tapered inwardly at their exterior ends, over which said grooves engaged by said shoulders are closed, whereby said pawl is secured against outward pressure,—all constructed and disposed to automatically lock securely a nut, substantially as described and shown.

4. The combination in a nut-lock of the kind described, of a threaded bolt, provided with longitudinal grooves; a nut, provided with an exteriorly-entering recess; a spring pawl positioned therein and secured at its longitudinal center, constructed and disposed to engage automatically said grooves, whereby the nut is locked, and a key, constructed and disposed to enter the aperture provided by said recess beneath said pawl and raising said pawl out of engagement with said grooves, whereby the nut is unlocked, substantially as described and set forth.

JOHN EDWARD HERMAN.

Witnesses:
WILBUR H. OSBORN,
MARGARET MOSER.

---

Copies of this patent may be obtained for five cents each, by addressing the "Commissioner of Patents Washington, D. C."